(12) United States Patent
Gagnon

(10) Patent No.: US 6,922,506 B2
(45) Date of Patent: Jul. 26, 2005

(54) TEMPERATURE COMPENSATING OPTICAL COMPONENT PACKAGING STRUCTURE

(75) Inventor: Daniel Gagnon, Montreal (CA)

(73) Assignee: ITF Optical Technologies, Inc., Montreal (CA)

(*) Notice: Subject to any disclaimer, the term of this patent is extended or adjusted under 35 U.S.C. 154(b) by 2 days.

(21) Appl. No.: 10/720,322

(22) Filed: Nov. 25, 2003

(65) Prior Publication Data

US 2005/0058395 A1 Mar. 17, 2005

(51) Int. Cl.$^7$ ................................................. G02B 6/34
(52) U.S. Cl. ........................................ 385/37; 385/147
(58) Field of Search .............................. 385/10, 31, 37, 385/39, 50, 147; 386/88–92

(56) References Cited

U.S. PATENT DOCUMENTS

| | | | |
|---|---|---|---|
| 5,042,898 A | | 8/1991 | Morey et al. |
| 5,694,503 A | * | 12/1997 | Fleming et al. ............... 385/37 |
| 5,914,972 A | * | 6/1999 | Siala et al. .................... 372/33 |
| 5,991,483 A | * | 11/1999 | Engelberth .................... 385/37 |
| 6,377,727 B1 | | 4/2002 | Dariotis et al. |
| 6,398,778 B1 | * | 6/2002 | Gu et al. ....................... 606/15 |
| 2002/0141700 A1 | | 10/2002 | Lachance et al. |

* cited by examiner

Primary Examiner—Akm Enayet Ullah
(74) Attorney, Agent, or Firm—Louis Tessler; George J. Primak

(57) ABSTRACT

A packaging structure for supporting a segment of optical fiber provided with a wavelength filter optically coupled thereto. The wavelength filter defines a temperature dependent center wavelength and a rate of wavelength drift per temperature change. The optical fiber is attachable about a fiber fast first attachment point and a fiber second attachment point to a housing having a generally hollow housing body for protecting the wavelength filter. The structure allows for both adjustment of the center wavelength and also for adjustment of the rate of wavelength drift per temperature change independently from the adjustment of the center wavelength. The wavelength excursion is typically adjusted by adjusting the spacing between the fiber first and second adjustment points. The center wavelength is typically independently adjusted by adjusting the tension imparted on the wavelength filter when the fiber is attached to the housing.

41 Claims, 7 Drawing Sheets

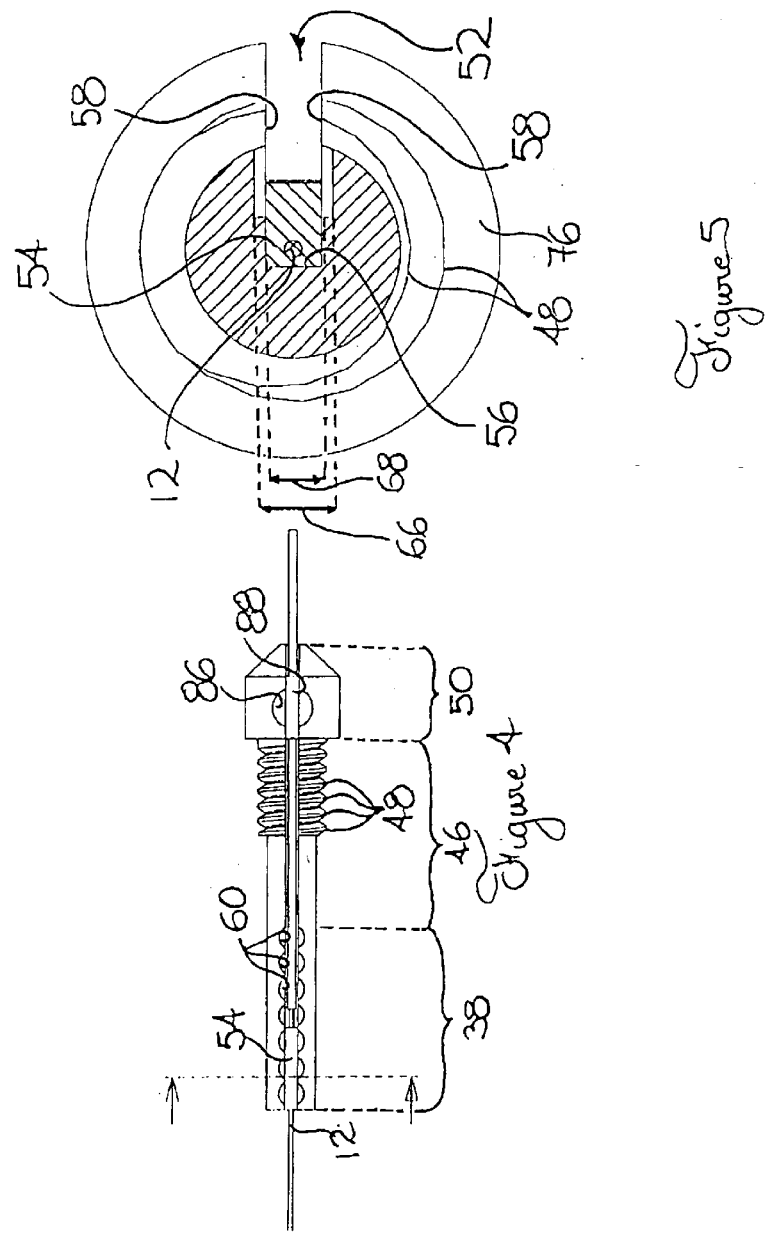

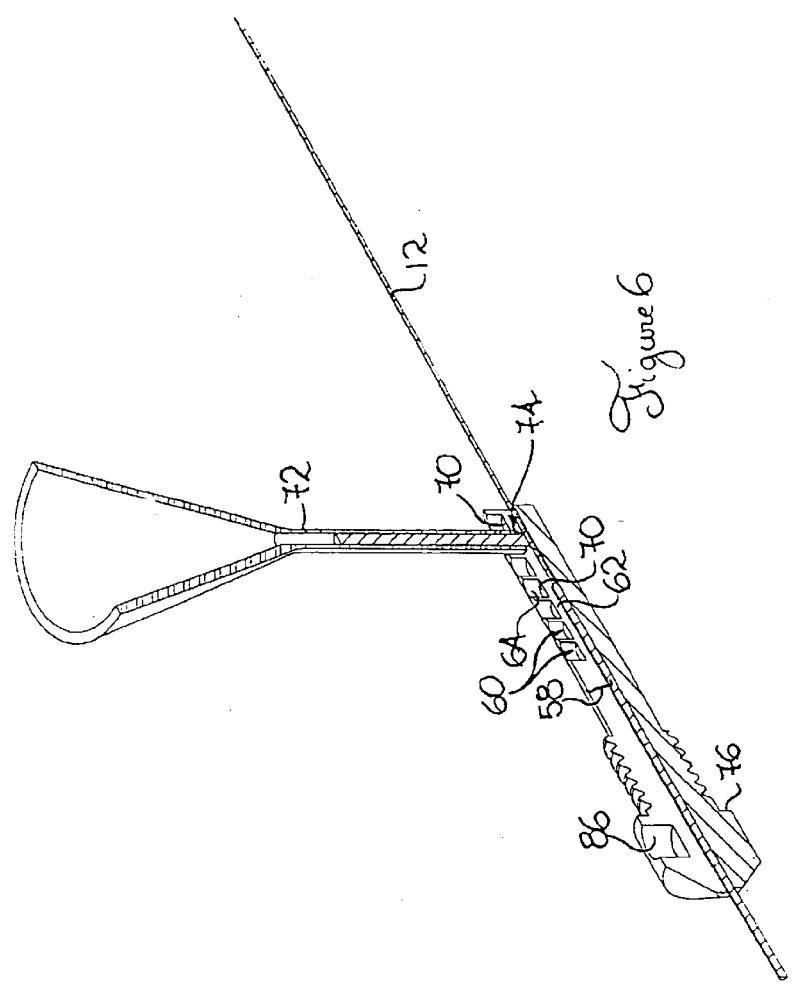

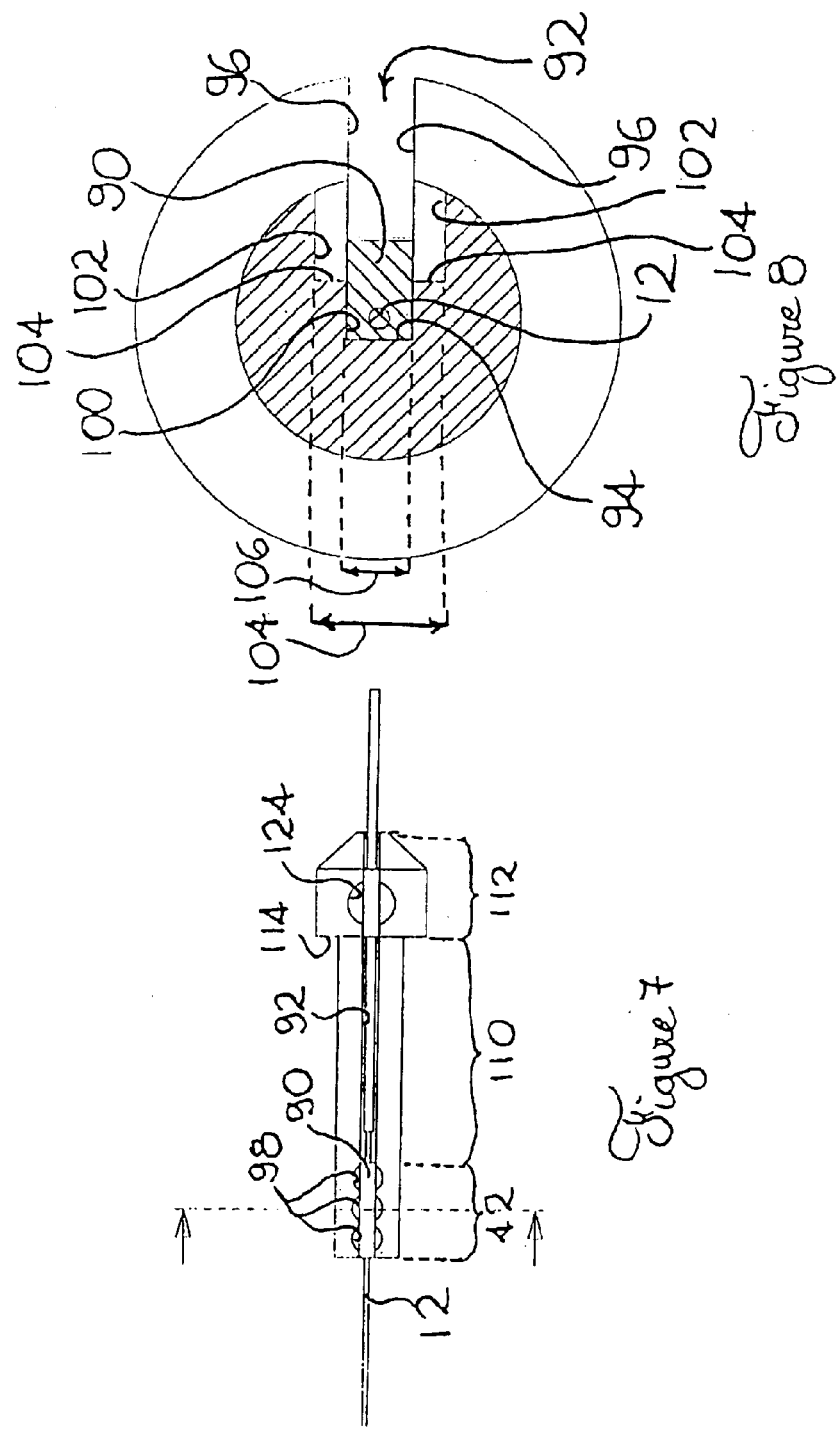

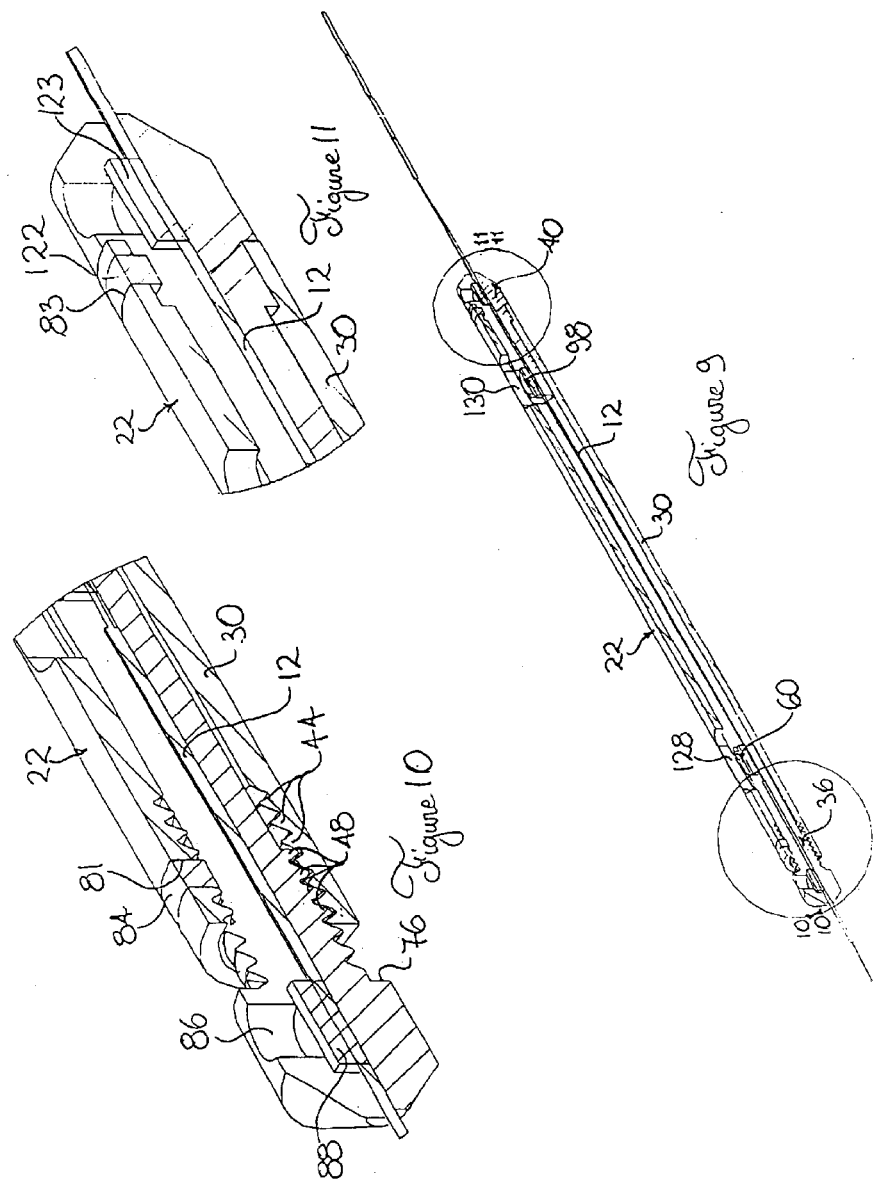

TEMPERATURE COMPENSATING OPTICAL COMPONENT PACKAGING STRUCTURE

FIELD OF THE INVENTION

The present invention relates to the general field of packaging structures and is particularly concerned with a temperature compensating optical component packaging structure.

BACKGROUND OF THE INVENTION

Optical fibers capable of transmitting optical signals containing a large amount of information over long distances and with relatively low losses have become important components of modern communication networks. The development of such communication networks has led to a concurrent need, in various applications, for selectively controlling specific wavelengths of light within the optical fibers.

Bragg filters commonly also referred to as Bragg gratings are well known and commonly employed filters for filtering particular light wavelengths in various applications. By way of example, they are commonly used for compensating chromatic dispersion in optical fibers, for stabilizing the frequency of semi-conductor lasers, for wavelength division multiplexing (WDM) and for stabilizing and flattening the gain of optical fibers. Bragg gratings are also commonly used in instrumentation applications such as in sensors for the measurement of strain, temperature and hydrostatic pressure. They are further commonly used as narrow band wavelength-selective reflectors for fiber lasers.

The conventional Bragg grating typically includes an optical fiber in which the index of refraction along the core thereof undergoes periodic perturbations or modulations. These perturbations may be equally spaced in the case of an unchirped grating or may be unequally spaced in the case of a chirped grating.

Bragg gratings in optical fibers are conventionally fabricated by providing a fiber having a core doped with one or more materials sensitive to ultraviolet light, such as a fiber having a core doped with germanium oxide. The fiber having a doped core is exposed at periodic intervals to high intensity ultraviolet light emanating from a laser or other suitable source.

The ultraviolet light interacts with the photosensitive dopants to produce the perturbations in the index of refraction. The appropriate period spacing of the perturbations to achieve a conventional grating can be obtained by use of a physical mask, a phase mask, a pair of interfering beams or other suitable means.

In use, light of a proper wavelength is reflected when it encounters the refractive index modulation whereas the remaining wavelength passes essentially unimpeded. The Bragg grating hence behaves as a wavelength-selective reflector having a characteristic spectral response.

In a uniform grating, the strongest reflection of light occurs at a so-called Bragg wavelength $\lambda_B$. The Bragg wavelength $\lambda_B$ is typically equal to twice the effective grating period. In other words, $\lambda_B = 2n\Lambda$ where $\Lambda$ is the spatial period of the index modulation in the fiber grating and n is the average effective refractive index of the guided mode at the position of the grating.

Accordingly, any environmental condition affecting either n or $\Lambda$ will also affect the Bragg wavelength. As it turns out, both the distance or spatial period $\Lambda$ between successive perturbations of the index modulation and the refractive index n of the grating are temperature dependent. Indeed, the spatial period $\Lambda$ of the index modulation increases with temperature as a result of thermal expansion of the fiber. Also, so-called thermo-optic effect induces an increase in the refractive index n of fibers submitted to an increase in temperature.

These two effects combine to produce an overall increase of the Bragg wavelength with temperature. This temperature dependent increase of the Bragg wavelength is however typically primarily imputable to change in refractive index n as a result of the thermo-optic effect.

The spatial period $\Lambda$ of the index modulation or distance between successive perturbations is also typically increased when the optical fiber is stretched under the action of a tensile load. The tensile load induced increase in the spatial period $\Lambda$ of the index of modulation, in turn, again leads to an increase of the Bragg wavelength. The increase in the spatial period $\Lambda$ of the index of modulation caused by a tensile load imparted on the fiber is typically partially offset by an ensuing reduction in the refractive index n through a so-called photo-elastic or stress-optic effect.

The Bragg or resonance wavelength of an unpackaged fiber Bragg grating shifts nearly linearly with temperature variations and load-induced stress. The dependence of Bragg wavelenghts to temperature and load-induced stresses may be used advantageously in situations wherein Bragg gratings are incorporated in hydrostatic pressure, temperature, strain or other suitable types of sensors.

The dependence of Bragg gratings to load induced stresses and often more importantly to temperature is however disadvantageous when the Bragg grating is used in applications such as communication systems often requiring a good stability of the spectral response thereof. Indeed, as optical channel space becomes narrower for higher capacity communication systems, the requirements have become increasingly stringent for controlling and stabilizing the center wavelength of Bragg gratings.

In many optical communication systems, such as those employing wavelength division multiplexing, it is important that the carrier wavelength of each channel is maintained at a substantially precise value. Typically, acceptable variations in the value of the carrier wavelength of each channel are in the range of about ±0.1 nm.

Furthermore, for most optical communication systems, it is essential that the grating wavelength remains constant over the expected temperature range. Since commercial communication systems and advanced communication networks typically operate over an extensive range of temperature, the thermal dependence of Bragg gratings greatly limits their widespread use. Accordingly, for the accurate and reliable long term operation of devices such as gain flattening filters (GFFs), dense wavelength division multiplexing (DWDM) systems, dispersion compensators using chirped Bragg gratings or the like, suitable temperature compensation means are required.

The prior art is replete with both intrinsic and extrinsic methods and devices used for constructing various types of packages adapted to support Bragg gratings in such a way as to render their wavelength insensitive to temperature changes. Intrinsic methods and devices make use of the fiber properties themselves for athermally supporting Bragg gratings.

The intrinsic methods are typically used for sensing physical parameters other then temperature such as strain, hydrostatic pressure or the like. Intrinsic methods typically rely on a pair of gratings. A first grating is used to measure the chosen physical parameter while also reacting to a change in temperature. The second grating is used in parallel for calibration purposes. The second grating measures the change in temperature only hence allowing for correction a posteriori of the physical parameter as measured by the first grating. Intrinsic methods and devices have proven to be unsuitable for telecommunication applications wherein the spectral response of each individual Bragg gratings must be stabilized against relatively small temperature fluctuations.

Extrinsic devices and systems require an extra material in order to compensate for the thermal sensitivity of Bragg gratings. Extrinsic methods and devices may be classified according to whether they are of the active or passive type. With the active type, certain parameters are continuously monitored and dynamically controlled with a feedback loop. The Bragg wavelength may be corrected, for example, by controlling the temperature of the fiber using Peltier elements or by controlling the strain in the fiber using a piezoelectric elements. Although active thermal stabilization is relatively effective, it nevertheless suffers from severe drawbacks including costly implementation, potentially costly power consumption and inherent complexity potentially leading to reliability problems.

Passive temperature compensation devices make use of the inverse and generally linear relationship between the change in strain and the change in the value of the Bragg wavelength in Bragg gratings. Such devices also typically rely on the fact that the length and modulation period of a given Bragg grating are determined by the distance between two anchoring points used for mounting the Bragg grating under tension to the device. In general terms, they typically operate by controlling the elongation with temperature of the optical fiber containing the Bragg grating.

The structure of passive temperature compensation devices is typically designed so that the distance between the anchoring points and, hence, the modulation period of the grating decreases as the temperature increases. On the other hand, the index of refraction of the fiber increases with the temperature. The increase in the index of refraction is mainly imputable to the thermo-optic effect. It also results from a reduction in the stress-optic effect. The reduction in the stress-optic effect is, in turn, imputable to the decrease in tension as the fiber expands thermally and as the anchoring points move closer to one another.

The modulation period and refractive index thus display variations of opposite signs as the temperature fluctuates. Athermalization is achieved when these variations cancel out and the Bragg wavelength remains constant as the temperature fluctuates.

Mathematically, the variation with temperature of the Bragg wavelength is described by the following equation:

$$\frac{\Delta \lambda_B}{\lambda_B} = [\alpha_\alpha + \xi - p_e(\alpha_\alpha - \alpha_f)]\Delta T$$

Where $\alpha_\alpha$ is the coefficient of thermal expansion characterizing the thermal behavior of the distance between the anchoring points. The first term on the right hand side of the equation represents the effect of the change in length of the fiber. The second term represents the influence of the thermo-optic effect. The third term represents the change in the stress-optic effect in the fiber.

Athermalization is achieved when $$\alpha_\alpha = \frac{p_e \alpha_f + \xi}{1 + p_e} \qquad (2)$$

As long as the fiber remains under tension, the thermal expansion of the fiber is irrelevant except through its impact on the stress optic effect since the length of the grating is determined by the distance between the anchoring points. The initial strain in the fiber must hence be sufficient to keep it under tension over the full span of the operational temperature range.

Also, the level of applied tension is irrelevant in establishing the temperature dependence of the Bragg wavelength other than insuring that the fiber length is indeed controlled by the package. As a result, slight adjustments to the initial tension applied to the fiber can be used to fine-tune the absolute position of the characteristic spectral response of the grating.

If the optical parameters involved were to be constant, athermalization could be achieved at all temperatures. However, the optical parameters vary slightly with temperature and, hence, athermalization is only achieved at a given temperature around which the Bragg wavelength displays a generally parabolic variation with temperature.

Passive temperature compensation devices may be classified according to whether they use a material having an intrinsic negative coefficient of thermal expansion or at least two by-materials together providing a so-called differential expansion effect. When materials having an intrinsic negative coefficient of thermal expansion are used, the support material by itself tends to stabilize the Bragg wavelength around its initial value.

Although, theoretically interesting, structure using materials having an intrinsic negative coefficient of thermal expansion suffer from numerous drawbacks including that suitable materials are relatively scarce or difficult to produce and, hence, relatively expensive Also, the coefficient of thermal expansion of such materials needs to be precisely matched to the properties of the optical fiber, hence requiring a precise control of the material formulation.

Furthermore, the coefficient of thermal expansion of such materials needs to be relatively constant from one sample of material to another that may prove to be difficult to achieve in practice. In other words, it is particularly difficult to provide a negative coefficient of thermal expansion material that precisely compensates for temperature variations without any overcompensation or undercompensation.

With differential expansion temperature compensation devices, the fiber containing the Bragg grating is attached to a structure made of at least two materials having different and typically positive coefficients of thermal expansion. The multi-material structure is configured and sized so that the different rates of expansion between the structural components supporting the fiber induce a negative elongation or contraction of the fiber with increasing temperature. The fiber is pre-stretched at low temperature and allowed to relax as the temperature increases.

The distance between the anchoring points at which the fiber grating is fixed is given by the following equation:

$$L_\alpha = \sum_{i=1}^{N} c_i L_i$$

where c=+1 or −1 depending on the geometry of the structure and $L_i$ is the length of the $i^{th}$ element of the structure.

Accordingly, the coefficient of thermal expansion of the structure is given by the following equation:

$$\alpha_\alpha = \frac{1}{L_\alpha} \frac{dL_\alpha}{dT} = \frac{\sum_{i=1}^{N} c_i L_i \alpha_i}{\sum_{i=1}^{N} c_i L_i}$$

Where $\alpha_i$ is the coefficient of thermal expansion of the $i^{th}$ material used. For example, when the structure is made up of only two distinct materials, the above equation is reduced to:

$$L_\alpha = L_1 - L_2$$

and $$\alpha_\alpha = \frac{\alpha_1 L_1 - \alpha_2 L_2}{L_1 - L_2}$$

The variation of the Bragg wavelength in such a structure is described by the following equation:

$$\frac{\Delta \lambda_B}{\lambda_B} = \left[ \frac{\alpha_1 L_1 - \alpha_2 L_2}{L_1 - L_2} + \xi - p_e \left( \frac{\alpha_1 L_1 - \alpha_2 L_2}{L_1 - L_2} - \alpha_f \right) + \eta \right] \Delta T$$

Where η represents the effect of the behavior of the adhesive used for anchoring the fiber to the structure at the anchoring points.

Various types of temperature compensation devices using differential expansion are known. For example, U.S. Pat. No. 5,042,898 issued Aug. 27, 1991 and naming William W. Morey et al. as inventors teaches a temperature compensated optical wave guide device wherein a portion of an optical fiber containing a Bragg grating is secured at each side thereof to a different one of two compensating members. The compensating members are made of materials with such coefficients of thermal expansion relative to one another and to that of the fiber material as to apply longitudinal strains to the fiber, the magnitude of the longitudinal strains varying with temperature so as to compensate the changes in the Bragg wavelength attributable to changes in temperature. Numerous other documents teach variations or additional features based on the basic structure disclosed in U.S. Pat. No. 5,042,898.

One of the major drawbacks associated with conventional differential expansion-type temperature compensation structures relates to the fact that such structures are deprived of a suitable and reliable means for adjusting the value of the Bragg wavelength. The need for providing a suitable Bragg wavelength adjustment means has been recognized in the past. For example, U.S. Patent Application Publication U.S. 2002/0141700 A1 published Oct. 3, 2002 and naming Richard L. Lachance et al. as inventors discloses a device including a hollow structure having a threaded and a free member projecting therein respectively from opposed ends. An optical fiber is mounted in tension inside the hollow structure through longitudinal fiber-receiving bores in both members. The optical fiber has an anchor point affixed to each member. A grating is positioned between the anchoring points. The hollow structure and the members have a coefficient of thermal expansion selected so that they together compensate for the temperature dependency of the Bragg wavelength.

One of the main objects of the invention disclosed in U.S. Patent Application Publication U.S. 2002/0141700 A1 is to provide an athermal packaging where the Bragg wavelength is easily adjustable. Adjustment of the Bragg wavelength is accomplished by varying the tension on the fiber. The tension on the fiber is varied by modifying the relative positional relationship between the threaded member and the hollow structure. This positional relationship is, in turn, modified by rotating the free and threaded members together relative to the hollow structure. A nut may be provided to allow fine-turning of the resonant wavelength.

Although the structure disclosed in the hereinabove-mentioned patent application publication provides some improvement over other prior art devices by incorporating relatively fine-tunable resonant wavelength adjustment means, it nevertheless suffers from other drawbacks. One of these drawbacks is the inherent interdependency between the adjustment of the tension imparted on the fiber and a corollary adjustment of the spacing between the anchor points.

Indeed, because of its structural characteristics and because of the inherent method of manufacturing the package disclosed in the herein-above mentioned patent application, any modification of the tension imparted therewith on the fiber necessarily implies that the spacing between the anchor points will also be modified in a predetermined direction. Hence, when the tension is increased, the distance between the anchor points is also necessarily increased. Conversely, when the tension imparted on the fiber is decreased, the distance between the anchor points id necessarily decreased.

Since the modification of the tension imparted on the fiber and the distance of the anchor points is inherently interdependent, the adjustment of the center or Bragg wavelength and of the rate of wavelength drift per temperature change or wavelength excursion by temperature change is also inherently interdependent. The inability to allow for independent adjustment of the Bragg wavelength and of the wavelength excursion by temperature change may prove to be unsatisfactory in numerous situations. For example, some components such as certain types of GFFs only allow for a relatively small margin of error for both the tuning of the Bragg wavelength and athermicity.

Also, with the structure disclosed in U.S. Patent Application Publication U.S. 2002/0141700 A1, for a given package size, the only means of accurately varying the distance between the anchor points is through rotation of the threaded member. Consequently, in situations such as when the coefficient of thermal expansion of the materials varies from one structure to another or when the structure needs to be manufactured using materials exhibiting coefficients of thermal expansion different from that for which the device has been designed or used, the displacement range of the thread may prove insufficient to allow for adequate tuning or, alternatively, the threaded portion of the threaded member may need to be oversized in order to allow for adequate tuning. This, in turn, may lead to potentially inacceptable increases in the overall size of the structure.

The structure disclosed in U.S. Patent Application Publication No. 2002/0141700 A1 also suffers from failing to provide a means for ensuring precise, ergonomic and reliable positioning of the attachment components used for fixing the fiber to the members about the anchoring points during assembly. Since the performance of the structure is highly dependent on the repeatability of the manufacturing process, this may prove to be a major drawback. As a result, more stringent manufacturing is required thus leading to reduced yields and limited performance. In addition, the design of the above-mentioned device does not afford a post-manufacturing adjustment to accurately tune the response of the grating to precisely and repeatably achieve the desired temperature sensitivity specifications.

The need for allowing adjustment of the spacing between the anchoring points of the fiber to the supporting structure has been recognized in the past. For example, U.S. Pat. No. 6,377,727 issued Apr. 23, 2002 and naming Stavros Dariotis et al as inventors discloses a temperature compensating package for a fiber Bragg grating device in which the fiber Bragg grating is written to the fiber prior to the temperature compensation being set.

The device includes a housing member having a longitudinal channel defined therein by first and second side walls. First and second thermal compensation members are sized in dimension to fit within the longitudinal channel and are fixed within the latter on opposite sides of a longitudinal coupling region.

The first and second thermal compensation members each have a top surface including a first region proximal to the coupling region and a second region distal to the coupling region. The first and second thermal compensation members have a second coefficient of thermal expansion that is greater than the coefficient of thermal expansion of the housing member.

Although the device disclosed in U.S. Pat. No. 6,377,727 allows for customization of the spacing between the fiber anchoring points, it fails to teach and, in fact, teaches away from providing a means for adjusting the spacing between the anchoring points and, hence, the tension within the fiber once the fiber is anchored to the structure. Hence, this structure also fails to provide means for allowing independent adjustment of both the central wavelength and the wavelength excursion per temperature differential. The structure also suffers from failing to provide a means for allowing accurate, ergonomic and reliable attachment of the fiber to the structure about the fiber anchoring points. Accordingly, there exists a need for an improved temperature compensating optical component packaging structure.

SUMMARY OF THE INVENTION

It is therefore a general object of the present invention to provide such an improved structure for athermally and adjustably supporting a segment of optical fiber having an optical component attached thereto.

Advantages of the present invention include that the proposed packaging structure provides for accurate thermal compensation over a relatively wide temperature range. Furthermore, the proposed structure allows for independent adjustment of both the Bragg wavelength and the wavelength excursion per temperature change. Also, the proposed structure allows for both relatively coarse and relatively fine tuning of the Bragg wavelength.

Furthermore, the proposed structure provides means for facilitating customization of the spacing between the anchoring points used for attaching the fiber to the structure.

Accordingly, the proposed structure is able to provide for suitable tuning of the wavelength excursion per temperature change without the need for increasing the overall size of the structure or need for materials presenting a wide range of coefficients of thermal expansion.

Also, the proposed structure allows for customization of the spacing between the anchoring points while still providing adequate structural protection to the sensible sections of the segment of optical fiber attached thereto. Furthermore, the proposed device is designed so as to allow for accurate positioning of attachment components used for attaching the fiber to the structure through a set of easily repeatable, quick and ergonomic steps without requiring special tooling or manual dexterity. Still furthermore, the proposed device is designed so as to reduce the risks of damaging the fiber during attachment thereof to the structure.

Also, the proposed device is designed so as to allow for effective control of the induced tension in the optical fiber during assembling. Still furthermore, the proposed device is designed so as to be manufacturable using conventional forms of manufacturing through conventional manufacturing processes so as to provide a device that will be economically feasible, long-lasting and relatively trouble free in operation.

In accordance with the present invention, there is provided a packaging structure for supporting a segment of optical fiber, the fiber defining a fiber longitudinal axis, a fiber first end and an opposed fiber second end, the fiber being provided with a wavelength filter optically coupled thereto between the fiber first and second ends; the wavelength filter defining a temperature dependent center wavelength and a rate of wavelength drift per temperature change; the optical fiber being attachable about a fiber first attachment point and a fiber second attachment point to the packaging structure, the fiber first and second fiber points being positionable respectively between the fiber first end and the wavelength and between the fiber second end and the wavelength filter, the packaging structure comprising: a housing having a generally hollow housing body, the housing body defining a housing body first end and a substantially opposed housing body second end; a fiber-to-housing attachment means for attaching the fiber to the housing so that the wavelength filter is substantially protectively positioned within the housing body, a center wavelength adjustment means for allowing adjustment of the center wavelength; an independent wavelength excursion adjustment means for allowing adjustment of the rate of wavelength drift per temperature change independently from the adjustment of the center wavelength.

Conveniently, the center wavelength adjustment means includes a fiber tension adjustment means for allowing adjustment of the tension imparted on the wavelength filter when the fiber is attached to the housing. Conveniently, the wavelength excursion adjustment means includes an attachment point spacing adjustment means for allowing adjustment of the spacing between the fiber first and second adjustment points.

In accordance with the present invention, there is also provided a packaging structure for supporting a segment of optical fiber, the fiber defining a fiber longitudinal axis, a fiber first end and an opposed fiber second end, the fiber being provided with an optical component optically coupled thereto between the fiber first and second ends for modifying the optical characteristics of an optical signal traveling therethrough, the modification of the optical characteristics of the optical signal imputable to the optical component being at least in part dependant on the temperature and strain conditions imparted on the optical component, the optical fiber being attachable about a fiber first attachment point and a fiber second attachment point to the packaging structure, the fiber first and second fiber points being positionable respectively between the fiber first end and the optical component and between the fiber second end and the optical component; the packaging structure comprising: a housing having a generally hollow housing body, the housing body defining a housing body first end and a substantially opposed housing body second end; a first component mounted on the housing substantially adjacent the housing body first end, the first component being provided with a first channel extending therethrough for receiving a portion of the fiber, the first channel defining a first channel axis, the first channel axis being in a generally collinear relationship relative to the fiber longitudinal axis, a fiber-to-first component attachment means extending between the fiber and the first component for attaching the fiber first attachment point to the first component; a fiber-to-housing attachment means extending between the fiber and the housing for attaching the fiber second attachment point to the housing; the fiber first and second attachment points being spaced relative to each other in a direction generally parallel to the fiber longitudinal axis by an adjustable fiber point spacing; a per-attachment customization means associated with the structure for allowing customization of the length of the fiber point spacing during attachment of the fiber first and second attachment points respectively to the first component and the housing; a post-attachment customization means associated with the structure for allotting customization of the length of the fiber point spacing after attachment of the fiber first and second attachment points respectively to the first component and the housing; the housing being made of a housing material having a housing coefficient of thermal expansion, the first component being made out of a first component material, the housing and first component coefficients of thermal expansion being selected so as to compensate for the dependency of the optical characteristics of the optical signal imputable to the optical component.

Typically, the first component is movably mounted on the housing body for axial movement relative thereto, the post-attachment customization means including a first component moving means for selectively moving the first component in direction substantially parallel to the first channel axis.

In accordance with the present invention, there is further provided an optical fiber packaging structure for athermally and adjustably supporting a segment of optical fiber, the fiber defining a fiber longitudinal axis, a fiber first end and a fiber second end, the fiber being provided with an optical component optically coupled thereto between the fiber first and second ends for modifying the optical characteristics of an optical signal traveling therethrough, the modification of the optical characteristics of the optical signal imputable to the optical component being at least in part dependant on the temperature and strain conditions imparted on the optical component, the packaging structure comprising: a housing having a generally hollow housing body, the housing body defining a housing body first end and a substantially opposed housing body second end; a first component movably mounted on the housing substantially adjacent the housing body first end, the first component being provided with a first channel extending therethrough for receiving a portion of the fiber, the first channel defining a first channel axis, the first component being selectively movable for displacement relative to the housing in a direction substantially parallel to the first channel axis, the first component defining a first component attachment location for allowing attachment thereto of the fiber substantially adjacent the fiber first end, the housing defining a housing attachment location for allowing attachment relative thereto of the fiber substantially adjacent the fiber second end; a fiber-to-first component attachment means extending between the fiber and the first component for attaching the fiber to the first component attachment location; a fiber-to-housing attachment means extending between the fiber and the housing for attaching the fiber to the housing attachment location;

the first component and housing attachment locations being spaced relative to each other in a direction generally parallel to the fiber axis by an adjustable location spacing; a location spacing first adjustment means for allowing adjustment of the length of the location spacing by allowing adjustment of the position of either one of the first component or housing attachment locations respectively on the first component and housing; a location spacing second adjustment means extending between the first component and the housing for allowing adjustment of the length of the location spacing by adjusting the positional relationship between the first component and the housing, the housing being made of a housing material having a housing coefficient of thermal expansion, the first component being made out of a first component material, the housing and first component coefficients of thermal expansion being selected so as to compensate for the dependency of the optical characteristics of the optical signal imputable to the optical component.

Conveniently, the location spacing first adjustment means allows adjustment of the length of the location spacing by allowing adjustment of both the first component and housing attachment locations respectively on the first component and housing.

Typically, the housing includes a second component mounted on the housing substantially adjacent the housing body second end, the fiber-to-housing attachment means including a fiber-to-second component attachment means extending between the fiber and the second component for attaching the fiber to the second component substantially adjacent the fiber second end.

In accordance with the present invention, there is still farther provided a packaging structure for supporting a segment of optical fiber having a grated section, the packaging structure comprising: a housing having a housing body defining a housing body outer surface, a housing body first end and a housing body second end, the housing body having a housing channel extending therethrough for receiving the grated section therein, the housing channel defining a housing channel longitudinal axis; a first component and a second component both mounted on the housing body respectively adjacent the housing body first and second ends, the first and second components respectively defining first and second component-to-fiber attachment sections both freely engaging the housing channel in opposite directions for securing the fiber in a tensioned state therebetween; the first component being movably coupled to the housing body for allowing the first component-to-fiber attachment section to selectively slide axially within the housing channel; the housing body being provided with at least one access window formed therein and extending substantially transversally from the housing body outer surface to the housing channel, the access window being positioned, configured and sized so as to be substantially in register with at least a portion of a selected one of the first or second component-to-fiber attachment sections for allowing physical access thereto; the housing being made of a housing material having a housing coefficient of thermal expansion, the first component being made out of a first component material having a first component coefficient of thermal expansion, the housing, first and second component coefficients of thermal expansion being selected so as to compensate for the thermal dependency of the grated section.

Typically, the first component is movably coupled to the housing body so as to allow the first component-to-fiber attachment section to translate within a predetermined translational range inside the housing channel; the access window being positioned, configured and sized so as to allow physical access to the first component-to-fiber attachment section throughout the translational range of the latter.

Conveniently, the housing body is provided with a first access window and a second access window formed therein, both the first and second access windows extending substantially transversally from the housing body outer surface to the housing channel, the first access window being positioned, configured and sized so as to be substantially in register with at least a portion of the first component-to-fiber attachment section for allowing physical access thereto and the second access window being positioned, configured and sized so as to be substantially in register with at least a portion of the second component-to-fiber attachment section for allowing physical access thereto.

BRIEF DESCRIPTION OF THE DRAWINGS

Embodiments of the present invention will now be disclosed, by way of example, in reference to the following drawings in which similar reference numerals are used to denote similar components and in which:

FIG. 4, in a top view illustrates a first component part of the packaging structure shown in FIG. 1;

FIG. 5, in a transversal cross-sectional view taken along arrows 5—5 of FIG. 4, illustrates some of the cross-sectional features of the first component shown in FIG. 4;

FIG. 6, in a partial perspective view, longitudinally cross-sectioned, and with sections taken out, illustrates a segment of optical fiber being secured to the first component shown in FIG. 2 using an adhesive dispensing implement, only a portion of which is shown;

FIG. 7, in a top view illustrates the second shown in FIG. 3;

FIG. 8, in a side elevational view, illustrates some of the features of the second component shown in FIG. 7;

FIG. 9, in a perspective view with sections taken out, illustrates the longitudinal cross-section of a packaging structure in accordance with an alternative embodiment of the present invention, the packaging structure being shown supporting a strip of optical fiber having a grating marked thereon;

FIG. 10, in a partial perspective view taken inside arrows 10—10 of FIG. 9, illustrates some of the features of the embodiment shown in FIG. 9;

FIG. 11, in a partial perspective view taken inside arrows 11—11 of FIG. 9, illustrates some of the features of the embodiment shown in FIG. 9.

DETAILED DESCRIPTION

Figure 1:
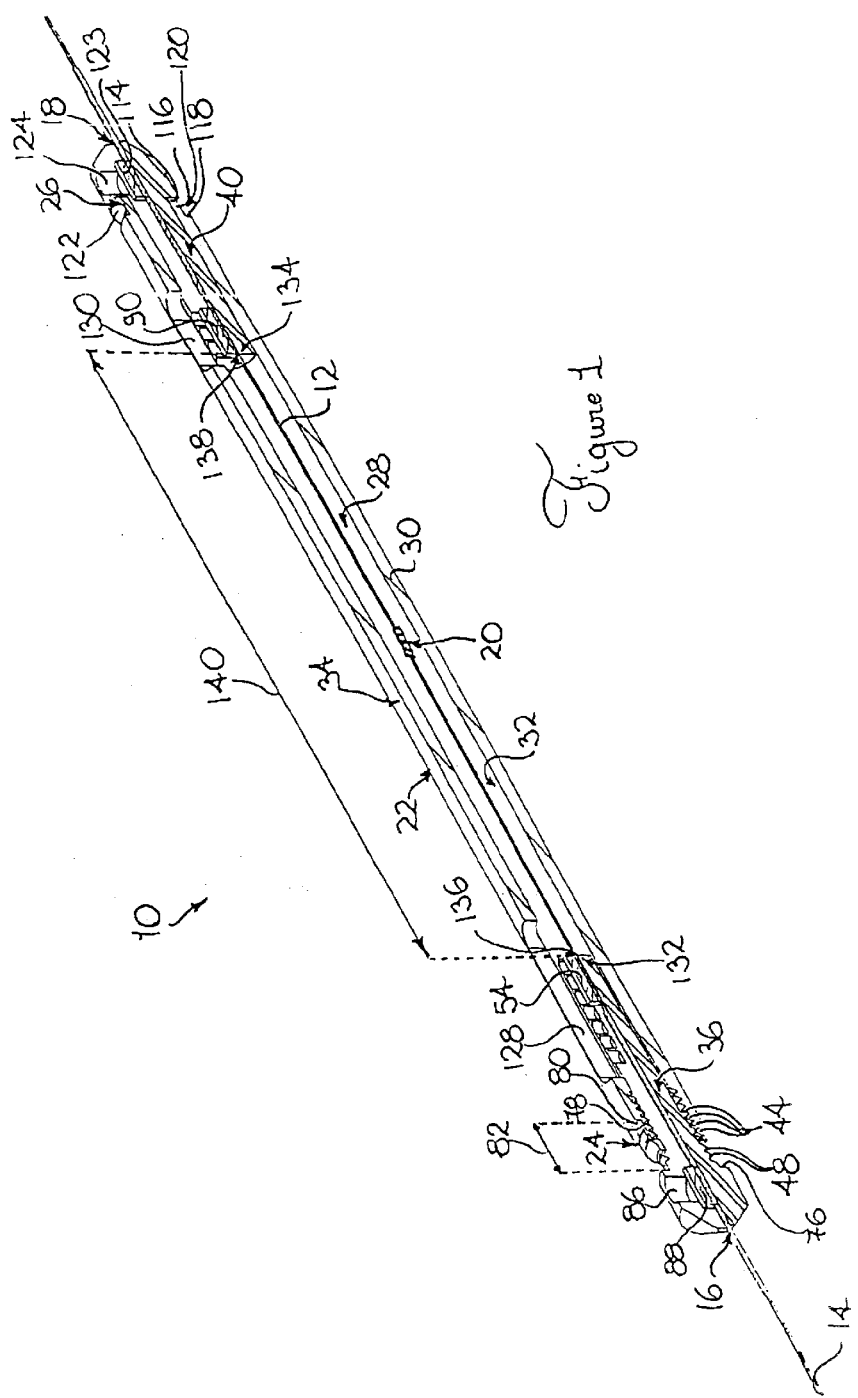
FIG. 1, in a perspective view with sections taken out, illustrates the longitudinal cross-section of a packaging structure in accordance with an embodiment of the present invention, the packaging structure being shown supporting a strip of optical fiber having a grating marked thereon.

Referring to FIG. 1, there is shown a temperature compensating optical component packaging structure 10 in accordance with an embodiment of the present invention. The packaging structure 10 is typically used for athermally and adjustably supporting a segment of optical fiber 12. The segment of optical fiber 12 defines a fiber longitudinal axis 14, a fiber first end 16 and an opposed fiber second end 18.

The segment of optical fiber 12 is typically provided with an optical component 20 optically coupled thereto between the fiber first and second ends 16, 18 for modifying the optical characteristics of an optical signal traveling therethrough. The optical component 20 is such that the modifications imputable thereto of the optical characteristics of the optical signal are, at least in part, dependent on the temperature and strain conditions imparted on the optical component 20.

Typically, the optical component 20 includes optical fiber Bragg gratings. In situations wherein the optical component 20 includes fiber Bragg gratings, the modification of the optical characteristics of the optical signal 20 typically depend on the temperature and stress conditions imparted on the fiber Bragg gratings since the wavelength of light reflected by the fiber Bragg gratings varies nearly linearly with temperature and stress.

The packaging structure 10 includes a housing having a generally hollow housing body 22. The housing body 22 defines a housing body first end 24 and a substantially opposed housing body second end 26. The housing body 22 has a housing channel 28 extending therethrough for receiving the optical component 20. Typically, the housing channel 28 defines a housing channel longitudinal axis (not shown) extending in a generally parallel or collinear relationship relative to the fiber longitudinal axis 14.

The housing body 22 typically includes a housing peripheral wall 30 defining a housing body inner surface 32 and a housing body outer surface 34. In the embodiments shown throughout the figures, the housing body 22 has a generally elongated and tubular configuration. It should however be understood that the housing body 22 could have other configurations without departing from the scope of the present invention.

The packaging structure 10 also includes a first component 36 mounted on the housing body 22 adjacent the housing body first end 24. As illustrated more specifically in FIG. 2, the first component 36 defines a first component-to-fiber attachment section 38 for generally freely engaging the housing channel 28. The first component-to-fiber attachment section 38 allows the optical fiber 12 to be attached thereto substantially adjacent the optical fiber first end 16.

Figure 3:
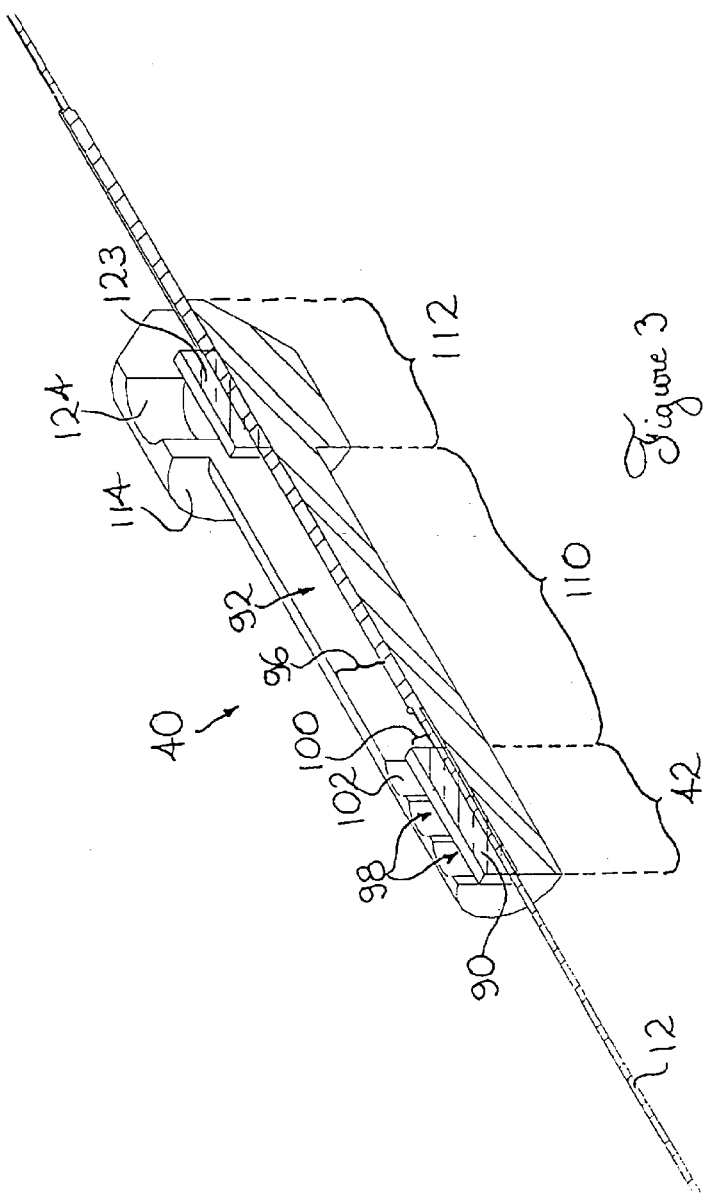
FIG. 3, in a partial perspective view, longitudinally cross-sectioned, and with sections taken out, illustrates a second component part of the packaging structure shown in FIG. 1.

In the embodiments shown throughout the figures, the packaging structure 10 further includes a second component 40 mounted on the housing body 22 adjacent the housing body second end 26. As illustrated more specifically in FIG. 3, the second component 40 similarly defines a second component-to-fiber attachment section 42 for freely engaging the housing channel 28 in an opposite direction to that of the first component-to-fiber attachment section 38. The second component-to-fiber attachment section 42 allows attachment of the fiber 12 thereto substantially adjacent the fiber second end 18.

It should however be understood that the optical fiber 12 may be otherwise attached to the housing body 22 adjacent the fiber second end 18 than with the use of the second component 40 without departing from the scope of the present invention. For example, the optical fiber 12 may be attached directly to the housing body 22 adjacent the fiber second end 18. Also, in order to simplify the description of the packaging structure 10, the second component 40 is hereinafter sometimes referred to as being part of the housing components.

The first component 36 is typically movably coupled to the housing body 22 for allowing the first component-to-fiber attachment section 38 to selectively slide axially within the housing channel 28. Typically, the first component 36 is movably coupled to the housing body 22 so as to allow the first component-to-fiber attachment section 38 to translate within a predetermined translational range inside the housing channel 28. This predetermined translational range typically allows for compensation of the thermal dependence of the optical component 20 while maintaining the optical fiber 12 in a tensioned state.

Typically, the first component 36 is movably coupled to the housing body 22 by a threaded link extending therebetween. It should however be understood that the first component 36 could be movably coupled to the housing body 22 using any other type of suitable coupling means.

In the embodiments shown throughout the figures, the housing inner surface 32 is provided with a housing thread 44 formed thereon substantially adjacent the housing body first end 24 for threadably engaging the first component 36. The first component 36 typically further defines a first component-to-housing mounting section 46 extending generally axially and outwardly from the first component-to-fiber attachment section 38. The first component-to-housing mounting section 46 is provided with first component threads 48 formed thereon for threadably engaging the housing threads 44.

In the embodiments shown throughout the figures, the first component 38 still further defines a first component grasping section 50 extending generally axially and outwardly from the first component-to-housing mounting section 46 opposite the first component-to-fiber attachment section 38. The first component grasping section 50 allows the first component 36 to be grasped for facilitating relative rotational movement between the first component 36 and the housing body 22 in order to allow the housing threads 44 and the first component threads 46 to cooperate in axially displacing the first component-to-fiber attachment section 38 within the housing channel 28. Typically, although by no means exclusively, The first component grasping section 50 defines a substantially conical tip to facilitate coupling to a supporting structure or component during assembly.

The first component 36 defines a first component outer surface. The first component outer surface is provided with a first channel 52 formed therein and extending longitudinally therealong for receiving a section of the fiber 12. Typically, the first channel 52 extends throughout the length of the first component 36. Hence, the first channel 52 typically extends along the first component-to-fiber attachment section 38, the first component-to-housing mounting section 46 and the first component grasping section 50.

Also, typically, the first channel 52 defines a first axis (not shown) extending in a generally parallel or collinear relationship relative to the housing longitudinal axis and to the fiber longitudinal axis 14 when the first component 36 is mounted on the housing body 22. It should however be understood that the first channel 52 could extend only partially along the length of the first component 36 and in another geometrical relationship relative thereto without departing from the scope of the present invention.

The thread/length ration or number of threads per unit of length of the housing threads 44 and the first component threads 46 determine the magnitude of the axial movement of the first component-to-fiber attachment section 38 relative to the housing channel 28 per turn of the first component 36. The thread/length ratio hence also determines the magnitude of modification of the axial strain on the optical fiber 12 per turn of the first component 36. Typically, although by no means exclusively, the housing threads 44 and the first component threads 46 are selected so that the first component 36 produces an axial movement of 0.45 mm per rotation. It should however be understood that the thread/length ratio could vary without departing from the scope of the present invention.

The first component-to-fiber attachment section 38 defines a first component attachment location for allowing attachment thereto of the fiber 12 substantially adjacent the fiber first end 16. The packaging structure 10 still further includes a fiber-to-first component attachment means extending between the fiber 12 and the first component 36 for attaching the fiber 12 to the first component attachment location.

Typically, the fiber 12 is attached to the first component-to-fiber attachment section 38 by a first component-to-fiber layer 54 of adhesive material extending therebetween. This adhesive material may be any suitable type of adhesive material such as an epoxy resin or the like. Typically, although by no means exclusively, the adhesive material is an epoxy resin sold by the Epoxy Technology company under the trade name "353NDT". The adhesive material is typically chosen so as to present viscosity characteristics that will minimize the change of configuration of the first component-to-fiber layer 54 during both application and curing thereof.

It should however be understood that numerous techniques or means may be employed to fix or attach the fiber 12 to first component-to-fiber attachment section 38 without departing from the scope of the present invention. For example, the attachment means may include the use of various materials individually or in combination. Examples of suitable material include an organic polymer adhesive such as an epoxy cement, an inorganic frit such as ground glass, a ceramic or a glass-ceramic material, a metal or any other suitable material. Mechanical fastening means, magnetic attachment means or any other suitable means may also be used.

As illustrated more specifically in FIG. 5, the first channel 52 typically has a substantially U-shaped cross-sectional configuration defining a first channel base wall 56 and a pair of first channel side walls 58 extending from the first channel base wall 56 in a substantially opposed relationship relative to each other. It should be understood that although the first channel side walls 58 are shown throughout the figures as extending generally perpendicularly from the first channel base wall 56, the first channel side walls 58 could extend from the first channel base wall 56 in other angular relationships relative thereto without departing from the scope of the present invention.

The first component-to-layer of adhesive material 54 preferably circumferentially surrounds a longitudinal segment of the fiber 12. Also, preferably, the first component-to-fiber layer of adhesive material 54 is also in contact with a corresponding longitudinal segment of the first channel base wall 56 and the first channel side walls 58. The first channel 52 is configured and sized so as to substantially fittingly receive the fiber 12 surrounded by the first component-to-fiber layer of adhesive material 56. This substantially tight fit is adapted to prevent lateral deflection of the fiber 12 within the first channel 52.

Figure 2:
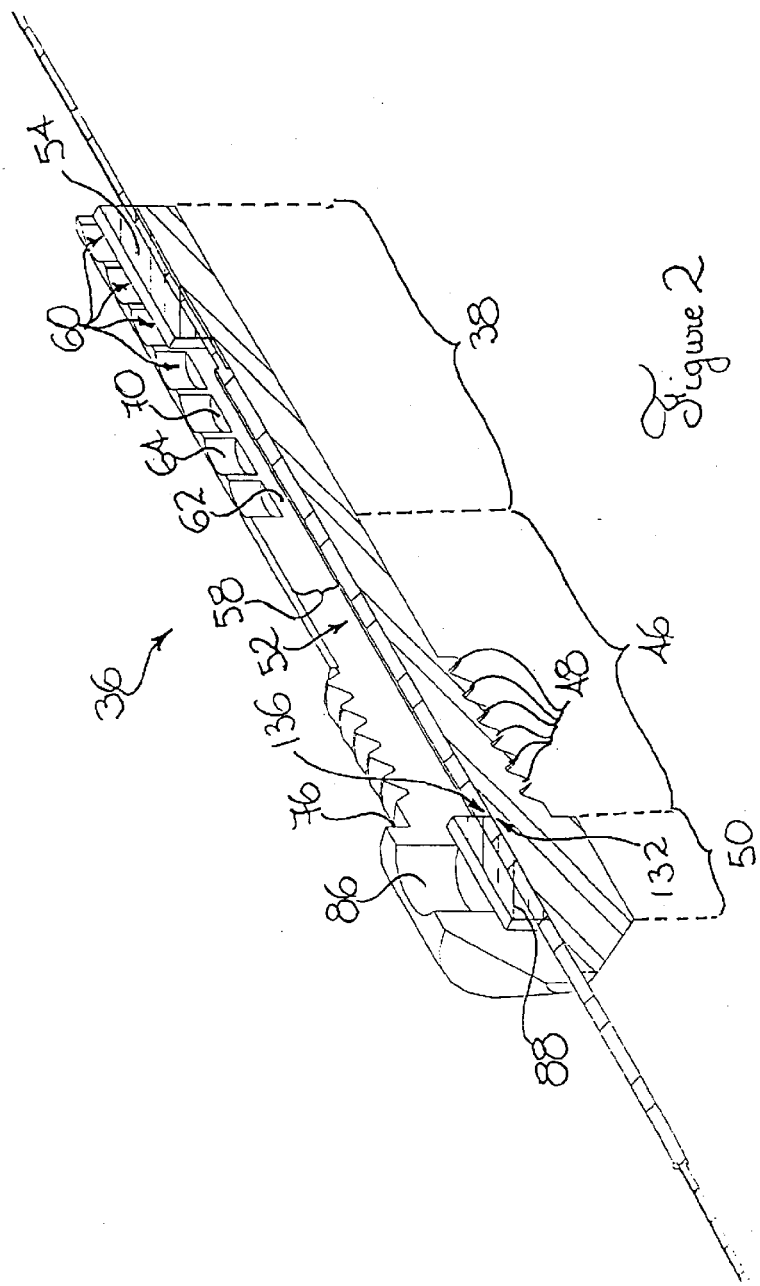
FIG. 2, in a partial perspective view, longitudinally cross-sectioned, and with sections taken our, illustrates a first component part of the packaging structure shown in FIG. 1.

As illustrated more specifically in FIG. 2, at least one and preferably both first channel side walls 58 define at least one anchoring portion 60 wherein the first component attachment location is intended to be positioned. Within the anchoring portion 60, at least one and preferably both first channel side walls define a side wall attachment section 62 extending from the first channel base wall 56 and a side wall guiding section 64 extending from the first component outer surface to a corresponding side wall attachment section 62.

The side wall guiding section 64 is recessed inwardly toward the first component outer surface relative to the side wall attachment section 62. Accordingly, as shown more specifically in FIG. 5 the width 66 of the first channel about the side wall guiding section 64 is greater than the width 68 of the first channel above the side wall attachment section 62.

As shown in FIG. 2, the side wall attachment and guiding sections 62, 64 define a side wall abutment shoulder 70 extending therebetween. Typically, the side wall abutment shoulder 70 extends in a substantially perpendicular relationship relative to the side wall attachment and guiding sections 62, 64.

In the embodiment shown in FIGS. 9 to 11, at least one and preferably both first channel side walls 58 include a single generally elongated anchoring portion 60. In the embodiment shown in FIG. 2. 1 through 8, at least one and preferably both first channel side walls 58 define at least two (2) and typically seven (7) anchoring portions 60 positioned in an incrementally and predetermined space relationship relative to each other along the first channel side walls 58. Each anchoring portion 60 defines a corresponding side wall attachment section 62, side wall guiding section 64 and side wall abutment shoulder 70.

The first component-to-fiber attachment section 38 is typically provided with attachment facilitating means formed thereon for facilitating attachment thereto of the fiber 12 at the first component attachment location. In the embodiment shown in FIGS. 1 through 8, the attachment facilitating means is adapted to facilitate attachment of the fiber at predetermined and incrementally spaced locations therealong. Typically, the attachment facilitating means includes a quantity calibrating means for facilitating the calibration of the quantity of adhesive material used for forming the first component-to-layer of adhesive material 54 during attachment of the fiber 12 to the first component-to-fiber attachment section 38.

The first component-to-fiber layer of adhesive material 54 may be positioned between the fiber 12 and the first component-to-fiber attachment section 38 using various methods. In accordance with one of these methods illustrated in FIG. 6, the first component-to-fiber layer of adhesive material 54 is positioned between the fiber 12 and the first component-to-fiber attachment section 38 using an adhesive dispensing implement having a generally elongated and cylindrical outlet nozzle 72 defining a nozzle distal end 74. The attachment facilitating means typically includes an implement guiding means for guiding the adhesive dispensing implement (only a portion of which is shown in FIG. 6) during use thereof for dispensing the first component-to-fiber layer of adhesive material 54 between the fiber 12 and the first component-to-fiber attachment section 38.

As shown in FIG. 6 the side wall attachment section 64 is typically configured and sized for abuttingly guiding the dispensing nozzle 72 during use thereof for dispensing the first component-to-fiber layer of adhesive material 54. Typically, at least one of the side wall guiding sections 64 has a substantially arcuately concave configuration for substantially fittingly receiving a corresponding arcuately convex portion of the discharge nozzle 72. The side wall guiding section 64 thus allows for precise positioning of the discharge nozzle 72 preventing displacement thereof both in the direction of the fiber longitudinal axis 14 and in a perpendicular direction leading transversely away from the fiber 12.

The side wall abutment shoulder 70 is typically configured and sized so as to abuttingly contact the nozzle outlet end 74 hence abuttingly limiting the insertion of the dispensing nozzle 72 into the first channel 52 in a direction leading from the first component outer surface towards the first channel base wall 56.

Typically, the side wall attachment and guiding sections 62, 64 are configured and sized so as to provide a clearance between the nozzle discharge end 74 and the fiber 12 when the nozzle discharge end 74 abuttingly contacts the side wall abutment shoulder 70. This clearance prevents potentially damaging contacts between the discharge nozzle 72 and the fiber 12. The clearance also allows the adhesive material to be dispensed so that the first component-to-fiber layer of adhesive material 54 surrounds the fiber 12.

Typically, the adhesive dispensing implement is a. "Selinger" (a trade mark) adhesive dispensing implement. It should however be understood that any suitable type of adhesive dispensing implement could be used without departing from the scope of the present invention and that other methods could be used for positioning the first component-to-fiber layer of adhesive material 54 between the fiber 12 and the first component-to-fiber attachment section 38 without departing from the scope of the present invention.

As shown more specifically in FIGS. 1 and 2, the diameter of the first component grasping section 50 is typically greater than that of the first component-to-housing mounting section 46 so as to define a first component mounting-to-grasping section shoulder 76 therebetween. Typically, the first component mounting-to-grasping section shoulder 76 extends in a substantially perpendicular relationship relative to the first component outer surface. It should be understood that the first component mounting-to-grasping section shoulder 76 could extend in other angular relationships relative to the first component outer surface without departing from the scope of the present invention.

As illustrated in FIG. 1, the housing peripheral wall 30 typically defines a housing first flange section 78 adjacent the housing first end 24. The housing first flange section 78 has a smaller wall thickness than that of the remainder of the housing peripheral wall 30. The housing first flange section 78 defines a peripheral housing first shoulder 80 extending towards the housing outer surface 34. Typically, the housing first shoulder 80 extends in a generally perpendicular relationship relative to the housing outer surface 34 although the housing first shoulder 80 could extend in other angular relationships relative to the housing outer surface 34 without departing from the scope of the present invention.

In the embodiment shown in FIG. 1, when the first component 36 is mounted on the housing body 22, the first component mounting-to-grasping section shoulder 76 and the housing first shoulder 80 are typically spaced relative to each other so as to define a generally annular first component-to-housing recess 82 therebetween. Typically, the first component-to-housing recess 82 is at least partially filled with a first component-to-housing layer of adhesive material 84 for adhesively securing the first component 36 to the housing body 22.

Optionally, the first component grasping section 50 is further provided with a first grasping section aperture 86 leading from said first component outer surface to said first channel 52. Typically, the packaging structure 10 further includes a first grasping section-to-fiber layer 88 of adhesive material positioned between the fiber 12 and a portion of the first channel 52 extending in the grasping section 50. The first grasping section aperture 86 allows a suitable adhesive dispensing implement to dispense the first grasping section-to-fiber layer of adhesive material 88 to the portion of the first channel 52 extending in the grasping section 50.

Typically, the first component-to-fiber layer of adhesive material contacts a non-coated segment of optical fiber whereas the first grasping section-to-fiber layer of adhesive material 88 contacts a coated segment of fiber 12. The first grasping section-to-fiber layer of adhesive material 88 provides structural rigidity in order to allow the fiber 12 to sustain axial traction with reduced risks of displacement between the fiber 12 and the packaging structure 10. Typically, although by no means exclusively, the first grasping section-to-fiber layer of adhesive material 88 is made out of an epoxy resin or other suitable material.

Typically, the first component-to-fiber layer of adhesive material 54 extends over an axial length having a value substantially in the range of 2 millimeters. Typically, although by no means exclusively, the side wall guiding section has a diameter substantially in the range of 0.78 millimeters, hence, the discharge nozzle 72 is typically positioned successively in three adjacent guiding sections 60 during dispensing of the volume of adhesive material required for forming the first component-to-fiber layer of adhesive material 54. It should however be understood that the component-to-fiber layer of adhesive material 54 could have any suitable size or configuration without departing from the scope of the present invention.

Similarly, the second component-to-fiber attachment section 42 is typically provided with attachment facilitating means formed thereon for facilitating attachment thereto of the fiber 12 at a predetermined location. Also, similarly, the attachment facilitating means of the second component-to-fiber attachment section 42 in the embodiment shown in FIG. 3 facilitates attachment thereto of the fiber 12 at predetermined and incrementally spaced locations therealong.

The fiber 12 is typically attached to the second component-to-fiber attachment section 42 by a second component-to-fiber layer of adhesive material 90 extending therebetween. The attachment facilitating means typically includes a quantity calibrating means. Typically, the second component-to-fiber attachment section 42 has a generally elongated and tubular configuration.

Also, the second component-to-fiber attachment section 42 defines a second component-to-fiber attachment section outer surface provided with a second channel 92 formed therein and extending longitudinally therealong for receiving a section of the fiber 12 located adjacent the fiber second end 18. The second channel 92 defines a second axis (not shown). The second axis is typically in a generally parallel or co-linear relationship relative to the housing body longitudinal axis when the second component 40 is mounted on the housing body 22.

As illustrated in FIG. 8, the second channel 92 typically has a cross-sectional configuration substantially similar to that of the first channel 52. Accordingly, the second channel 92 typically has a generally U-shaped cross-sectional configuration defining a second channel base wall 94 and a pair of second channel sidewall 96 extending from the second channel base wall 94 in a substantially opposed relationship relative to each other.

The second component-to-fiber layer of adhesive material 90 typically circumferentially surrounds a longitudinal segment of the fiber 12 and is typically in contact with a corresponding longitudinal segment of the second channel base wall 94 and side walls 96. The second channel 92 is typically configured and sized so as to substantially fittingly receive the fiber 12 surrounded by the second component-to-fiber layer of adhesive material 90 for preventing lateral deflection of the fiber 12 within the second channel 92.

Similarly, at least one of the second channel side walls 96 has at least one anchoring portion 98. Each anchoring portion 98 defines a side wall attachment section 100 extending from the second channel base wall 94 and a side wall guiding section 102 extending from the second component outer surface to the side wall attachment section 100.

The side wall guiding section 102 is recessed inwardly toward the second component outer surface relative to the side wall attachment section 106 so that the width 104 of the second channel about the side wall guiding section 102 is greater than the width 106 of the second channel about the side wall attachment section 100. The side wall attachment and guiding sections 100, 102 define a side wall abutment shoulder 104 extending substantially perpendicularly therebetween. Similarly to the anchoring portions 60 of the first component 36, the anchoring portions 98 of the second component 40 allow for guiding of the nozzle section 72 part of the adhesive dispensing implement and limit insertion thereof within the second channel 92.

The second component 40 typically further defines a second component-to-housing mounting section 110 allowing axial movement of the second component 40 relative to the housing body 22. The second component-to-housing mounting section 110 typically extends integrally from the second component-to-fiber attachment section 42.

The second component-to-housing mounting section 110 is typically provided with a generally smooth outer surface for slidably engaging the housing channel 28. The second channel 92 typically extends integrally into the second component-to-housing mounting section 110 from the second component-to-fiber attachment section 42. Optionally, in an embodiment of the invention not shown, the second component 40 is threadably linked to the housing body 22 for also allowing selective axial movement therebetween.

The second component 40 similarly to the first component 36 typically defines a second component grasping section 112 extending from the second component-to-mounting section 110 in a direction opposite the second component-to-fiber attachment section 42. The second component 40 is also provided with a second component mounting-to-grasping section shoulder 114 and the housing peripheral wall defines a housing second flange section 116 delimiting a housing second shoulder 118.

The second component mounting-to-grasping section shoulder 114 and the housing second shoulder 118 are spaced relative to each other when the second component 40 is mounted on the housing body 22 so as to define a generally annular second component-to-housing recess 120. Typically, the second component-to-housing recess 120 is at least partially filled with a second component-to-housing layer of adhesive material 122 for adhesively securing the second component 40 the housing body 22.

Also, the second component 40, similarly to the first component 36, further defines a second component grasping section aperture 124 leading from the second component outer surface to the second channel 92. Also, the second grasping section-to-fiber layer of adhesive material 123 typically extends between the fiber 12 and a portion of the second channel 92 extending in the grasping section 112.

The housing body 22 is further provided with at least one and preferably two access windows 128, 130 formed therein and extending substantially transversely from the housing body outer surface 34 to the housing channel 28. In situations wherein only one access window 128 or 130 is provided, the latter is positioned, configured and sized so as to be substantially in register with at least a portion of a corresponding one of the first or second component-to-fiber attachment sections 38, 42 for allowing physical access thereto. When an access window 128 is provided, the access window 128 is typically positioned, configured and sized so as to allow physical access to the first component-to-fiber attachment section 38 throughout the translational range of the latter.

The first component 36 defines a first component attachment location 132 for allowing attachment thereto of the fiber 12 substantially adjacent the fiber first end 16. In other words, the first component attachment location 132 may be defined as the selected location at which the fiber component 12 will be attached on the first component 36.

Similarly, the housing defines a housing attachment location 134 for allowing attachment relative thereto of the fiber 12 substantially adjacent the fiber second end 18. In other words, is attached may be considered as the selected location on the housing at which the fiber 12 is attached adjacent the fiber second end 18. As mentioned previously, in order to facilitate the description of the packaging structure 10, the second component 40 may be considered as being part of the housing, hence, when a second component 40 is present, the housing attachment location 134 may be positioned on the second component 40.

The first component and housing attachment locations 132, 134 are typically selected according to various selection criteria including the desired value of % wavelength drift per temperature unit. The first component and housing attachment locations 132, 134 are spaced relative to each other in a direction generally parallel to the fiber longitudinal axis 14 by an adjustable location spacing. The value of the location spacing is typically adjusted according to various design parameters including the desired rate of Bragg wavelength shift per unit of temperature.

The first and/or second access apertures 128, 130 may hence be considered as a location spacing first adjustment means for allowing adjustment of the length of the location spacing by allowing adjustment of the position of either one of the first component or housing attachment locations 132, 134 respectively on the first component 36 and housing. Again, as mentioned previously, in order to facilitate the description of the packaging structure 10, the second component 40 may be considered as being part of the housing. Accordingly, in situations wherein both a second component 40 and a second access aperture 130 are provided, the second access aperture 130 may be considered as part of the location spacing first adjustment means.

The optical fiber 12 defines a fiber first attachment point 136 and a fiber second attachment point 138 about which the optical fiber 12 is attached respectively to the first component 36 and the housing. In other words, the fiber first attachment point 136 is defined at the selected an innermost location on the strip of optical fiber 12 at which the optical fiber 12 will be secured to the first component attachment location 132. Similarly, the fiber second attachment point 138 is defined as the location or point on the strip of optical fiber 12 at which the strip of optical fiber 12 is secured to the second attachment location 134.

The fiber first and second attachment points 136, 138 are spaced relative to each other in a direction generally parallel to the fiber longitudinal axis 14 by an adjustable fiber point spacing 140. The first and/or second access apertures 128, 130 may hence also be considered as a per-attachment customization means for allowing customization of the length of the fiber point spacing 140 during attachment of the fiber first and second attachment points 136, 138 respectively to the first component 36 and the housing. Again, in situations wherein a second component 40 is used, the second component 40 may be considered as part of the housing and, hence, when a second access aperture 130 is also present, the latter may be considered part of the per-attachment customization means.

Once the fiber first and second attachment points 136, 138 are respectively attached to the first component 36 and to the housing, customization of the length of the fiber point spacing 140 may be performed by moving the first component 36 relative to the fiber body 22. The movable coupling allowing selective relative movement between the first component 36 and the housing body 22 may hence be considered as a post-customization attachment means allowing customization of the length of the fiber points spacing 140 or as a location spacing second adjustment means for allowing adjustment of the length of the location spacing by adjusting the positional relationship between the first component 36 and the housing 22.

The housing body 22 is made out of a housing material having a housing coefficient of thermal expansion. Similarly, the first and second components 36, 40 are made out respectively of a first component and a second component material having respectively a first component and a second component coefficient of thermal expansion.

In situations wherein only the housing body and the first component 36 are used, the housing and the first component co-efficient of thermal expansion are selected so as to compensate for the thermal dependency of the optical component. In situations wherein both a first and a second component 36, 40 are used with the housing body 22, the housing, first and second component coefficients of thermal expansion are selected so as to compensate for the thermal dependency of the optical component 20.

Typically, although by no means exclusively, the housing body 22 is made out of a housing material having a generally low housing coefficient of thermal expansion such as quartz or Invar. Conversely, typically although by no means exclusively, the first and second components 36, 40 are made out of first and second component materials respectively having relatively high first and second component material coefficients of thermal expansion such as aluminum, brass, copper, stainless steel or the like.

In an alternative embodiment of the invention shown in FIGS. 9 through 11 instead of having a housing first flange section 78 and a peripheral housing first shoulder 80 the housing body 22 is provided with a first circumferential slot 81 and a second circumferential slot 83 both extending partially about the circumference of the housing body 22 respectively adjacent the housing body first and second ends 24, 26. The first and second circumferential slots 81, 83 are typically at least partially filled respectively with the first component-to-housing layer of adhesive material 84 for adhesively securing the first component 36 to the housing body 22 and the second component-to-housing layer of adhesive material 122 for adhesively securing the second component 40 the housing body 22.

What is claimed is:

1. A packaging structure for supporting a segment of optical fiber having a grated section, said packaging structure comprising a housing having a housing body defining a housing body outer surface, a housing body first end and a housing body second end, said housing body having a housing channel extending therethrough for receiving said grated section therein, said housing channel defining a housing channel longitudinal axis;

a first component and a second component both mounted on said housing body respectively adjacent said housing body first and second ends, said first and second components respectively defining first and second component-to-fiber attachment sections both freely engaging said housing channel in opposite directions for securing said fiber in a tensioned state therebetween;

said first component being movably coupled to said housing body for allowing said first component-to-fiber attachment section to selectively slide axially within said housing channel;

said housing body being provided with at least one access window formed therein and extending substantially transversally from said housing body outer surface to said housing channel, said access window being positioned, configured and sized so as to be substantially in register with at least a portion of a selected one of said first or second component-to-fiber attachment sections for allowing physical access thereto;

said housing being made of a housing material having a housing coefficient of thermal expansion, said first component being made out of a first component material having a first component coefficient of thermal expansion, said housing, first and second component coefficients of thermal expansion being selected so as to compensate for the thermal dependency of said grated section.

2. A packaging structure as recited in claim 1 wherein said first component is movably coupled to said housing body so as to allow said first component-to-fiber attachment section to translate within a predetermined translational range inside said housing channel; said access window being positioned, configured and sized so as to allow physical access to said first component-to-fiber attachment section throughout the translational range of the latter.

3. A packaging structure as recited in claim 2 wherein said housing body is provided with a first access window and a second access window formed therein, both said first and second access windows extending substantially transversally from said housing body outer surface to said housing channel, said first access window being positioned, configured and sized so as to be substantially in register with at least a portion of said first component-to-fiber attachment section for allowing physical access thereto and said second access window being positioned, configured and sized so as to be substantially in register with at least a portion of said second component-to-fiber attachment section for allowing physical access thereto.

4. A packaging structure as recited in claim 1 wherein said first component is movably coupled to said housing body by a treaded link extending therebetween.

5. A packaging structure as recited in claim 4 wherein said housing body has a substantially elongated and tubular housing peripheral wall, said housing peripheral wall defining a housing inner surface, said housing inner surface being provided with a housing thread for threadably engaging said first component.

6. A packaging structure as recited in claim 1 wherein said first component-to-fiber attachment section is provided with attachment facilitating means formed thereon for facilitating attachment thereto of said fiber at a predetermined location.

7. A packaging structure as recited in claim 1 wherein said first component-to-fiber attachment section is provided with attachment facilitating means formed thereon for facilitating attachment thereto of said fiber at predetermined and incrementally spaced locations therealong.

8. A packaging structure as recited in claim 6 wherein said fiber is attached to said first component-to-fiber attachment section by a first component-to fiber layer of adhesive material extending therebetween, said attachment facilitating means including a quantity calibrating means for calibrating the quantity of adhesive material used for forming said first component-to fiber layer of adhesive material during attachment of said fiber to said first component-to-fiber attachment section.

9. A packaging structure as recited in claim 6 wherein said fiber is attached to said first component-to-fiber attachment section by a first component-to fiber layer of adhesive material extending therebetween, said first component-to fiber layer of adhesive material being positioned between said fiber and said first component-to-fiber attachment section using an adhesive dispensing implement during manufacturing of said packaging structure, said attachment facilitating means including an implement guiding means for guiding said adhesive dispensing implement during use thereof for dispensing said first component-to fiber layer of adhesive material between said fiber and said first component-to-fiber attachment section.

10. A packaging structure as recited in claim 1 wherein said first component-to-fiber attachment section has a generally elongated and tubular configuration, said first component-to-fiber attachment section defining a first component-to-fiber attachment section outer surface, said first component-to-fiber attachment section outer surface being provided with a first channel formed therein and extending longitudinally therealong for receiving a section of said fiber, said first channel defining a first axis, said first axis being in a generally collinear relationship relative to said housing body longitudinal axis when said first component is mounted on said housing body.

11. A packaging structure as recited in claim 10 wherein said first channel has a substantially "U"-shaped cross-sectional configuration defining a first channel base wall and a pair of first channel side walls extending from said first channel base wall in a substantially opposed relationship relative to each other, said fiber being attached to said first component-to-fiber attachment section by a first component-to fiber layer of adhesive material extending therebetween; said first component-to fiber layer of adhesive material circumferentially surrounding a longitudinal segment of said fiber and being in contact with a corresponding longitudinal segment of said first channel base wall and side walls, said first channel being configured and sized so as to substantially fittingly receive said fiber surrounded by said first component-to fiber layer of adhesive material for preventing lateral deflection of said fiber within said first channel.

12. A packaging structure as recited in claim 10 wherein said first component defines a first component outer surface, said first channel having a substantially "U"-shaped cross-sectional configuration defining a first channel base wall and a pair of first channel side walls extending from said first channel base wall in a substantially opposed relationship relative to each other, at least one of said first channel side walls having an anchoring portion, said side wall about said anchoring portion defining a side wall attachment section extending from said first channel base wall and a side wall guiding section extending from said first component outer surface to said side wall attachment section, said side wall guiding section being recessed inwardly towards said first component outer surface relative to said side wall attachment section so that the width of said first channel about said side wall guiding section is greater then the width of said first channel about said side wall attachment section, said side wall attachment and guiding sections defining an abutment shoulder extending substantially perpendicularly therebetween.

13. A packaging structure as recited in claim 12 wherein said fiber is attached to said first component-to-fiber attachment section by a first component-to fiber layer of adhesive material extending therebetween, said first component-to fiber layer of adhesive material being positioned between said fiber and said first component-to-fiber attachment section using an adhesive dispensing implement during manufacturing of said packaging structure, said side wall attachment section being configured and sized for abuttingly guiding said adhesive dispensing implement during use thereof for dispensing said first component-to fiber layer of adhesive material between said fiber and said first component-to-fiber attachment section.

14. A packaging structure as recited in claim 13 wherein said abutment shoulder is configured and sized so as to abuttingly limit the insertion of said adhesive dispensing implement in said first channel about said anchoring portion.

15. A packaging structure as recited in claim 10 wherein said first component defines a first component outer surface, said first channel having a substantially "U"-shaped cross-sectional configuration defining a first channel base wall and a pair of first channel side walls extending from said first channel base wall in a substantially opposed relationship relative to each other, at least one of said first channel side walls having at least two anchoring portions positioned in an incrementally and predetermined spaced relationship relative to each other along said at least one of said first channel side walls, said side wall about each of said anchoring portions defining a side wall attachment section extending from said first channel base wall and a side wall guiding section extending from said first component outer surface to said side wall attachment section, said side wall guiding section being recessed inwardly towards said first component outer surface relative to said side wall attachment section so that the width of said first channel about said side wall guiding section is greater then the width of said first channel about said side wall attachment section, each of said side wall attachment and guiding sections defining a corresponding abutment shoulder extending substantially perpendicularly therebetween.

16. A packaging structure as recited in claim 15 wherein at least one of said side wall guiding sections has a substantially arcuately concave configuration.

17. A packaging structure as recited in claim 1 wherein said first component further defines a first component-to-housing mounting section for movably mounting said first component to said tube, said first component-to-housing mounting section extending integrally from said first component-to-fiber attachment section, said first component-to-housing mounting section being provided with first component threads formed thereon for threadably engaging said housing channel, said first component-to-fiber attachment section and said first component-to-housing mounting section being provided with a common first channel formed therein and extending longitudinally therealong for receiving a section of said fiber, said first channel defining a first axis, said first axis being in a generally collinear relationship relative to said housing body longitudinal axis when said first component is mounted on said housing body.

18. A packaging structure as recited in claim 17 wherein said first component further defines a first component grasping section extending from said first component-to-housing mounting section opposite said first component-to-fiber attachment section, said first component-to-fiber attachment section, said first component-to-housing mounting section and said first component grasping section being provided with a common first channel formed therein and extending longitudinally therealong for receiving a section of said fiber, said first channel defining a first axis, said first axis being in a generally collinear relationship relative to said housing longitudinal axis when said first component is mounted on said housing body.

19. A packaging structure as recited in claim 18 wherein said first component has a generally cylindrical configuration and defines a first component outer surface, the diameter of said first component grasping section being greater then that of the remainder of said first component-to-housing mounting section do as to define a first component mounting-to-grasping section shoulder between said first component-to-housing mounting section and said first component grasping section, said first component mounting-to-grasping section shoulder extending in a substantially perpendicular relationship relative to said first component outer surface; said housing peripheral wall defining a housing flange section adjacent said housing first end, said housing flange section having a smaller wall thickness then the that of the remainder of said housing peripheral wall, said housing flange section defining a housing first shoulder extending generally perpendicularly towards said remainder of said housing peripheral wall, said first component mounting-to-grasping section shoulder and said housing first shoulder being spaced relative to each other when said first component is mounted on said housing body so as to define a generally annular first component-to-housing recess therebetween.

20. A packaging structure as recited in claim 19 wherein said first mounting-to-grasping recess is at least partially filed with a first component-to-housing layer of adhesive material for adhesively securing said first component to said housing.

21. A packaging structure as recited in claim 18 wherein said first component defines a first component outer surface, said first component grasping section being provided with a first grasping section aperture extending substantially transversally from said housing body outer surface to said housing channel.

22. An optical fiber packaging structure for athermally and adjustably supporting a segment of optical fiber, said fiber defining a fiber longitudinal axis, a fiber first end and a fiber second end, said fiber being provided with an optical component optically coupled thereto between said fiber first and second ends for modifying the optical characteristics of an optical signal traveling therethrough, the modification of the optical characteristics of said optical signal imputable to said optical component being at least in part dependant on the temperature and strain conditions imparted on said optical component, said packaging structure comprising:
a housing having a generally hollow housing body, said housing body defining a housing body first end and a substantially opposed housing body second end;
a first component movabley mounted on said housing substantially adjacent said housing body first end, said first component being provided with a first channel extending therethrough for receiving a portion of said fiber, said first channel defining a first channel axis, said first component being selectively movable for displacement relative to said housing in a direction substantially parallel to said first channel axis;
said first component defining a first component attachment location for allowing attachment thereto of said fiber substantially adjacent said fiber first end, said housing defining a housing attachment location for allowing attachment relative thereto of said fiber substantially adjacent said fiber second end;
a fiber-to-first component attachment means extending between said fiber and said first component for attaching said fiber to said first component attachment location;
a fiber-to-housing attachment means extending between said fiber and said housing for attaching said fiber to said housing attachment location;
said first component and housing attachment locations being spaced relative to each other in a direction generally parallel to said fiber axis by an adjustable location spacing;
a location spacing first adjustment means for allowing adjustment of the length of said location spacing by allowing adjustment of the position of either one of said first component or housing attachment locations respectively on said first component and housing;
a location spacing second adjustment means extending between said first component and said housing for allowing adjustment of the length of said location spacing by adjusting the positional relationship between said first component and said housing;
said housing being made of a housing material having a housing coefficient of thermal expansion, said first component being made out of a first component material, said housing and first component coefficients of thermal expansion being selected so as to compensate for the dependency of said optical characteristics of said optical signal imputable to said optical component.

23. A packaging structure as recited in claim 22 wherein said location spacing first adjustment means allows adjustment of the length of said location spacing by allowing adjustment of both said first component and housing attachment locations respectively on said first component and housing.

24. A packaging structure as recited in claim 22 wherein said housing includes a second component mounted on said housing substantially adjacent said housing body second end, said fiber-to-housing attachment means including a fiber-to-second component attachment means extending betveen said fiber and said second component for attaching said fiber to said second component substantially adjacent said fiber second end.

25. A packaging structure as recited in claim 24 wherein said location spacing first adjustment means allows for adjustment of the length of said location spacing by allowing adjustment of the position of said housing attachment location on said second component.

26. A packaging structure as recited in claim 22 wherein said housing body includes a generally elongated tube;
said first component defines a first component-to-tube mounting section for mounting said first component to said tube and a generally elongated first component-to-fiber attachment section positioned within said tube for allowing attachment thereto of said fiber adjacent said fiber first end;
said location spacing first adjustment means including first access means formed in said tube for allowing access to said first component-to-fiber attachment section so as to allow said first component attachment location to be positioned at various locations along said first component-to-fiber attachment section.

27. A packaging structure as recited in claim 22 wherein said first access means includes a first access aperture formed in said tube generally in register with said first component-to-fiber attachment section.

28. A packaging structure as recited in claim 22 wherein said housing body includes a generally elongated tube;
said housing includes a second component mounted on said housing substantially adjacent said housing body second end, said fiber-to-housing attachment means including a fiber-to-second component attachment means extending between said fiber and said second component for attaching said fiber to said second component substantially adjacent said fiber second end;
said location spacing first adjustment means allows for adjustment of the length of said location spacing by allowing adjustment of the position of said housing attachment location on said second component;
said second component defines a second component-to-tube mounting section for mounting said second component to said tube and a generally elongated second component-to-fiber attachment section positioned within said tube for allowing attachment thereto of said fiber adjacent said fiber second end;
said location spacing first adjustment means including second access means formed in said tube for allowing access to said second component-to-fiber attachment section so as to allow said second component attachment location to be positioned at various locations along said second component-to-fiber attachment section.

29. A packaging structure as recited in claim 28 wherein said second access means includes a second access aperture formed in said tube generally in register with said second component-to-fiber attachment section.

30. A packaging structure as recited in claim 22 wherein said housing body includes a generally elongated tube;
said first component defines a first component-to-tube mounting section for mounting said first component to said tube and a generally elongated first component-to-fiber attachment section positioned within said tube for allowing attachment thereto of said fiber adjacent said fiber first end;
said location spacing first adjustment means including first access means formed in said tube for allowing access to said first component-to-fiber attachment section so as to allow said first component attachment location to be positioned at various locations along said first component-to-fiber attachment section;
said first access means includes a first access aperture formed in said tube generally in register with said first component-to-fiber attachment section;

said housing includes a second component mounted on said housing substantially adjacent said housing body second end, said fiber-to-housing attachment means including a fiber-to-second component attachment means extending between said fiber and said second component for attaching said fiber to said second component substantially adjacent said fiber second end;

said location spacing first adjustment means allows for adjustment of the length of said location spacing by allowing adjustment of the position of said housing attachment location on said second component;

said second component defines a second component-to-tube mounting section for mounting said second component to said tube and a generally elongated second component-to-fiber attachment section positioned within said tube for allowing attachment thereto of said fiber adjacent said fiber second end;

said location spacing first adjustment means including second access means formed in said tube for allowing access to said second component-to-fiber attachment section so as to allow said second component attachment location to be positioned at various locations along said second component-to-fiber attachment section;

said second access means includes a second access aperture formed in said tube generally in register with said second component-to-fiber attachment section.

31. A packaging structure as recited in claim 30 wherein said fiber-to-first component attachment means includes a first layer of adhesive material extending between said fiber and said first component attachment section about said first component attachment location;

said fiber-to-housing attachment means includes a second layer of adhesive material extending between said fiber and said second component attachment section about said housing attachment location.

32. A packaging structure as recited in claim 30 wherein said location spacing second adjustment means includes a threaded link between said first component and said housing, said threaded link allowing adjustment of the positional relationship between said first component and said housing.

33. A packaging structure for supporting a segment of optical fiber, said fiber being provided with a Bragg filter optically coupled thereto; said Bragg filter defining a temperature dependent Bragg wavelength and a rate of wavelength drift per temperature change; said optical fiber being attachable about a fiber first attachment point and a fiber second attachment point to said packaging structure; said packaging structure comprising:

a housing having a generally tubular housing body, a fiber-to-housing attachment means for attaching said fiber to said housing so that said Bragg filter is positioned within said housing body;

a Bragg wavelength adjustment means for allowing adjustment of said Bragg wavelength without modifying said rate of wavelength drift per temperature change;

a wavelength excursion adjustment means for allowing adjustment of said rate of wavelength drift per temperature change without modifying said Bragg wavelength.

34. A packaging structure for supporting a segment of optical fiber, said fiber defining a fiber longitudinal axis, a fiber first end and an opposed fiber second end, said fiber being provided with an optical component optically coupled thereto between said fiber first and second ends for modifying the optical characteristics of an optical signal traveling therethrough, the modification of the optical characteristics of said optical signal imputable to said optical component being at least in part dependent on the temperature and strain conditions imparted on said optical component, said optical fiber being attachable about a fiber first attachment point and a fiber second attachment point to said packaging structure, said fiber first and second fiber points being positionable respectively between said fiber first end and said optical component and between said fiber second end and said optical component; said packaging structure comprising:

a housing having a generally hollow housing body, said housing body defining a housing body first end and a substantially opposed housing body second end;

a first component mounted on said housing substantially adjacent said housing body first end, said first component being provided with a first channel extending therethrough for receiving a portion of said fiber, said first channel defining a first channel axis, said first channel axis being in a generally collinear relationship relative to said fiber longitudinal axis, a fiber-to-first component attachment means extending between said fiber and said first component for attaching said fiber first attachment point to said first component;

a fiber-to-housing attachment means extending between said fiber and said housing for attaching said fiber second attachment point to said housing;

said fiber first and second attachment points being spaced relative to each other in a direction generally parallel to said fiber longitudinal axis by an adjustable fiber point spacing;

a per-attachment customization means associated with said structure for allowing customization of the length of said fiber point spacing during attachment of said fiber first and second attachment points respectively to said first component and said housing;

a post-attachment customization means associated with said structure for allowing customization of the length of said fiber point spacing after attachment of said fiber first and second attachment points respectively to said first component and said housing;

said housing being made of a housing material having a housing coefficient of thermal expansion, said first component being made out of a first component material, said housing and first component coefficients of thermal expansion being selected so as to compensate for the dependency of said optical characteristics of said optical signal imputable to said optical component.

35. A packaging structure as recited in claim 34 wherein said first component is movably mounted on said housing body for axial movement relative thereto, said post-attachment customization means including a first component moving means for selectively moving said first component in direction substantially parallel to said first channel axis.

36. A packaging structure as recited in claim 35 wherein said first component moving means includes a threaded link formed between said housing body and said first component.

37. A packaging structure as recited in claim 36 wherein said housing body has a generally elongated and tubular configuration, said housing body defining a housing inner surface, said housing inner surface being provided with a housing thread adjacent said housing body first end;

said first component defines a first component-to-housing mounting section for mounting said first component to said tube and a generally elongated first component-to-fiber attachment section positionable within said housing for allowing attachment thereto of said fiber about said fiber first attachment point, said first component-to-housing mounting section having a generally cylindrical configuration and being provided with a first component external thread for threadably engaging said housing thread.

38. A packaging structure for supporting a segment of optical fiber, said fiber defining a fiber longitudinal axis, a fiber first end and an opposed fiber second end, said fiber being provided with a wavelength filter optically coupled thereto between said fiber first and second ends; said wavelength filter defining a temperature dependent center wavelength and a rate of wavelength drift per temperature change; said optical fiber being attachable about a fiber first attachment point and a fiber second attachment point to said packaging structure, said fiber first and second fiber points being positionable respectively between said fiber first end and said wavelength filter and between said fiber second end and said wavelength filter; said packaging structure comprising:

a housing having a generally hollow housing body, said housing body defining a housing body first end and a substantially opposed housing body second end;

a fiber-to-housing attachment means for attaching said fiber to said housing so that said wavelength filter is substantially protectively positioned within said housing body, a center wavelength adjustment means for allowing adjustment of said center wavelength;

an independent wavelength excursion adjustment means for allowing adjustment of said rate of wavelength drift per temperature change independently from the adjustment of said center wavelength.

39. A packaging structure as recited in claim 38 wherein said center wavelength adjustment means includes a fiber tension adjustment means for allowing adjustment of the tension imparted on said wavelength when said fiber is attached to said housing.

40. A packaging structure as recited in claim 38 wherein said wavelength excursion adjustment means includes an attachment point spacing adjustment means for allowing adjustment of the spacing between said fiber first and second adjustment points.

41. A packaging structure as recited in claim 38 wherein said center wavelength adjustment means includes a fiber tension adjustment means for allowing adjustment of the tension imparted on said wavelength filter when said fiber is attached to said housing;

said wavelength excursion adjustment means includes an independent attachment point spacing adjustment means for allowing adjustment of the spacing between said fiber first and second adjustment points independently from the adjustment of the tension imparted on said wavelength when said fiber is attached to said housing.

* * * * *